United States Patent [19]

Svensson

[11] Patent Number: 4,702,367
[45] Date of Patent: Oct. 27, 1987

[54] LOADING DEVICE FOR A BELT CONVEYOR

[75] Inventor: Kennet Svensson, Örkelljunga, Sweden

[73] Assignee: AB Siwertell, Bjuv, Sweden

[21] Appl. No.: 779,573

[22] Filed: Sep. 24, 1985

[30] Foreign Application Priority Data

Sep. 25, 1984 [SE] Sweden ................ 8404805

[51] Int. Cl.$^4$ ........................................... B65G 47/58
[52] U.S. Cl. ........................ 198/550.9; 198/550.1; 198/518; 198/612
[58] Field of Search ............ 198/611, 612, 518, 550.5, 198/550.6, 550.9, 586, 612, 526, 527, 528, 529, 550.1; 414/137, 139, 140, 144

[56] References Cited

U.S. PATENT DOCUMENTS

| 2,285,099 | 6/1942 | Mason ........................ 198/550.6 X |
| 2,778,509 | 1/1957 | Donsbach, Jr. .................... 198/611 |
| 4,020,953 | 5/1977 | Eklöf et al. ....................... 414/139 |
| 4,240,541 | 12/1980 | Worsley .......................... 198/518 |
| 4,286,909 | 9/1981 | Tingskog ......................... 414/139 |
| 4,591,310 | 5/1986 | Toaspern et al. ............... 198/586 X |
| 4,603,774 | 8/1986 | Siwersson et al. ................. 198/518 |

FOREIGN PATENT DOCUMENTS

| 0069635 | 4/1983 | Japan ............................. 414/139 |
| 0406070 | 1/1979 | Sweden . | |
| 1563142 | 3/1980 | United Kingdom . | |

Primary Examiner—Robert J. Spar
Assistant Examiner—Lyle Kimms
Attorney, Agent, or Firm—Browdy and Neimark

[57] ABSTRACT

A feed conveyor delivers bulk material which is transferred to a belt conveyor by a loading device. The loading device consists of a feed screw in a feed screw casing and imparts to the bulk material a motional component in the direction of travel of the belt conveyor. The discharge opening of the loading device is provided in the circumferential surface of the feed screw casing and is facing the conveyor belt and extends along it, such that the bulk material is discharged as a layer of material on the conveyor belt.

6 Claims, 5 Drawing Figures

LOADING DEVICE FOR A BELT CONVEYOR

FIELD OF THE INVENTION

The present invention relates to a loading device for a belt conveyor, i.e. a device which is arranged for transferring bulk material from a feed device to a belt conveyor. The invention is particularly intended for use in transferring bulk material from a vertical screw conveyor to a horizontal belt conveyor. In this context, "vertical" and "horizontal", respectively, indicates that the conveyors serve to transport the material substantially in the vertical and the horizontal direction, respectively, although both conveyors may be inclined in relation to the vertical and the horizontal line, respectively.

BACKGROUND OF THE INVENTION

In connection with the loading of bulk material onto a belt conveyor, it is customary in the art to let the bulk material simply drop onto the belt conveyor, so that this carries forward the material in its direction of travel. In certain cases, the bulk material has also been supplied to the belt conveyor with a horizontal component of motion, this being achieved by inclining the inlet opening, e.g. as disclosed in U.S. Pat. specification No. 2,988,202 to Fred A. Pampel et al. (granted 13th June 1961) or Swedish patent specification No. 303,715 to Skånska Cement AB, Sweden (published 12th Dec. 1968). In connection with a desire to obtain a controlled feed of material, it has further been suggested in Swedish patent specification No. 362,856 to Carl Schenck Maschinenfabrik GmbH (publised 4th Apr. 1974) to rely on dosing wheels determining the rate of supply to the belt conveyor.

SUMMARY OF THE INVENTION

The present invention is particularly useful in connection with the transfer of bulk material from a feeding screw conveyor to a belt conveyor for further conveyance of the material. In the use of a combination of a screw conveyor and belt conveyor, e.g. for unloading vessels, the screw conveyor often operates at very high feed rates, which places high demands on the belt conveyor and primarily on the transfer of the bulk material from the screw conveyor to the belt conveyor. The known devices for achieving such transfer have been found insufficient in many respects, and one object of the invention therefore is to overcome the drawbacks of the known transfer devices and, especially, to make it possible to transfer large amounts of material per unit of time from a screw conveyor to a belt conveyor.

This and other objects of the invention are achieved by means of a loading device designed as a rotary feed screw in a feed screw casing which is substantially parallel to the belt conveyor and has a discharge opening extending along at least a portion of the circumferential surface of the feed screw casing and facing the belt conveyor. It is then particularly advantageous if the material inlet opening of the loading device, through which the bulk material should be fed into the loading device, is substantially at right angles to the feed screw and is pivotally connected to the feed device for pivotal movement about a pivot axis passing through the material inlet opening at right angles to the feed screw. This particularly advantageous embodiment of the invention makes it possible, in connection with unloading devices, to incline or tilt the feed screw conveyor in relation to the vertical line and also to incline or tilt the belt conveyor in relation to the horizontal line, such that the feed screw conveyor constitutes the outer jib portion of a crane jib system and the belt conveyor constitutes part of the horizontal jib of the crane jib system.

In a further advantageous embodiment of the invention, the discharge opening extends from a location in substantial alignment with the pivot axis and up to the end surface of the feed screw casing. By such an arrangement, the belt will form the "bottom" of the feed screw casing, such that the delivered bulk material is loaded as a layer of material on the belt conveyor, the thickness of the layer of material being at least partly determined by the height of the circular segment of the end surface of the feed screw casing that has been removed to form the end of the discharge opening.

In another preferred embodiment of the invention, the material inlet opening has been disposed on a higher level than the shaft of the feed screw, i.e. such that the centre of the material inlet opening is at a greater distance from the belt conveyor than is the shaft of the feed screw. If the feed screw is at the same time rotated in such a manner that the material supplied is moving up and above the shaft of the feed screw before it descends to the belt conveyor, the efficiency of the loading device will be increased.

BRIEF DESCRIPTION OF THE DRAWINGS

The invention will be described in greater detail hereinbelow with reference to the accompanying drawings, in which.

DESCRIPTION OF THE PREFERRED EMBODIMENTS

Figure 1:
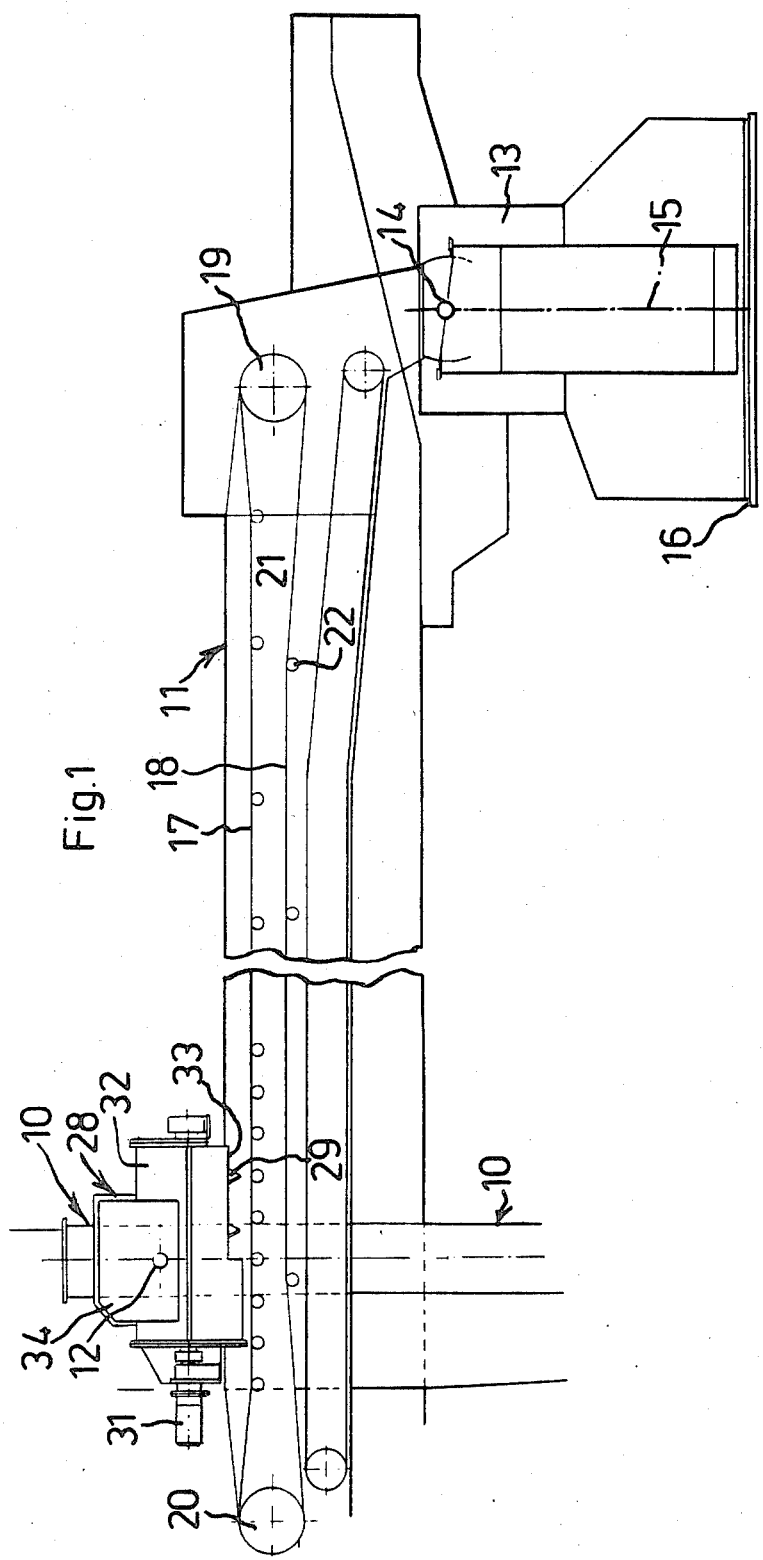
FIG. 1 is a schematic side view of parts of a ship unloading system having a loading device according to the present invention.

FIG. 1 shows parts of a ship unloading system having a vertical conveyor 10 and a horizontal conveyor 11 which are pivotally connected to each other for pivotal movement about a pivot axis 12. At its discharge end, the horizontal conveyor is pivotally mounted on a tower 13, such that the horizontal conveyor can pivot upwardly and downwardly about an axis 14 extending at right angles to the plane of the drawing in FIG. 1. The tower 13 in turn is rotatably mounted for rotational movement about a vertical axis of rotation 15. To this end, the tower may have a ring member 16 which is part of a conventional live ring assembly. In other respects, the loading device may be designed, e.g. as disclosed in Swedish Pat. No. 7503924-8 (390,157) to Siwertell AB, Bjuv, Sweden and published 6th Dec. 1976 and corresponding to U.S. Pat. No. 4,020,953 (3rd May 1977) or Swedish Pat. No. 7202285-8 (377,099) to AB Scaniainventor, Helsingborg, Sweden and published on 23rd June 1975 and corresponding to U.S. Pat. No. 3,990,567 (9th Sept. 1976).

As appears from FIG. 1, the horizontal conveyor is designed as a belt conveyor having an upper run 17 and a lower run 18. These two runs pass over guide rollers 19, 20, the upper run being also supported by back-up rollers 21 as is customary in the art. The lower run is also supported by back-up rollers 22. In the illustrated embodiment, the feed conveyor 10 is designed as a screw conveyor having a casing 23 and a screw 24. The screw 24 is rotatable by a motor (not shown) and, at its upper end, has a portion 25 with a screw thread of opposite direction. The dividing line between the two screw portions 24 and 25 is on a level with the centre line 26 of a feed opening 27 of a loading device 28. The loading device 28 and the feed conveyor 10 are pivotally connected to each other for pivotal movement about the geometrical axis 26. To this end, the connection between the conveyor 10 and the loading device 28 may be designed as disclosed e.g. in Swedish laid-open application No. 7510926-4 (406,070) to AB Siwertell, Bjuv, Sweden and published 22nd Jan. 1979 and corresponding to British Pat. No. 1,563,142 (granted 21st May 1980). Since the screw portion 25 has a thread of opposite direction relative to the screw portion 24, the bulk material will be positively guided into the feed opening 27 in a more efficient way.

According to the invention, the loading device 28 is designed as a screw conveyor having a feed screw 29 the shaft 30 of which is substantially parallel to the upper run 17 of the belt conveyor and is rotatable by means of a drive motor 31. The feed screw is mounted in a feed screw casing 32 which at its side facing the belt run 17 has a discharge opening 33 which preferably begins at a location in substantial alignment with the pivot axis 12 which coincides with the geometrical axis 26 of the inlet opening 27. The discharge opening 33 extends along the circumferential surface of the feed screw casing 33 up to the end surface thereof and has the shape of a circle segment. The inlet opening 27 is connected to a transition housing 34 which is open towards the feed screw but extends outwardly of the circumferential surface 32. The transition housing 34 serves to equalize the flow of material when the supply of material from the feed conveyor 10 varies.

Figure 2:
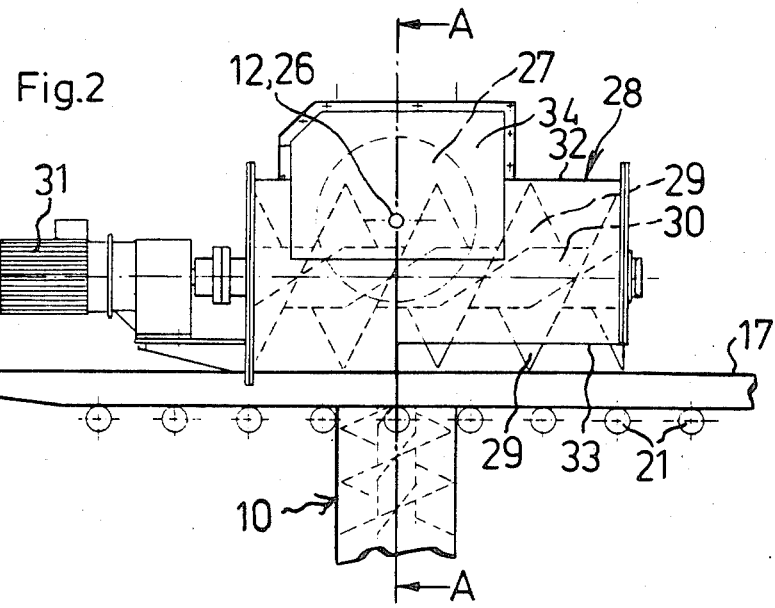
FIG. 2 illustrates the loading device per se in more detail and its relation to the feed conveyor and belt conveyor.
Figure 4:
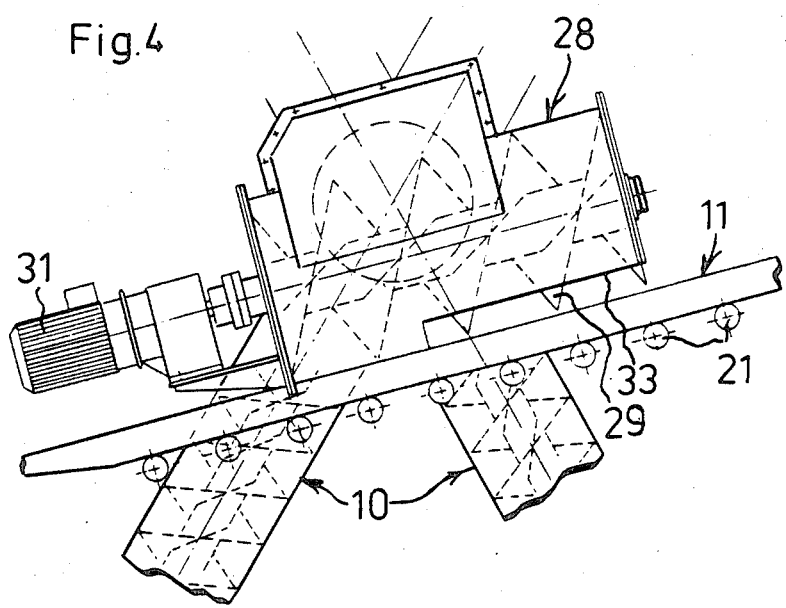
FIGS. 4 and 5 are views similar to FIG. 2 but illustrate different positions of adjustment of the belt and screw conveyors relative to the loading device.
Figure 3:
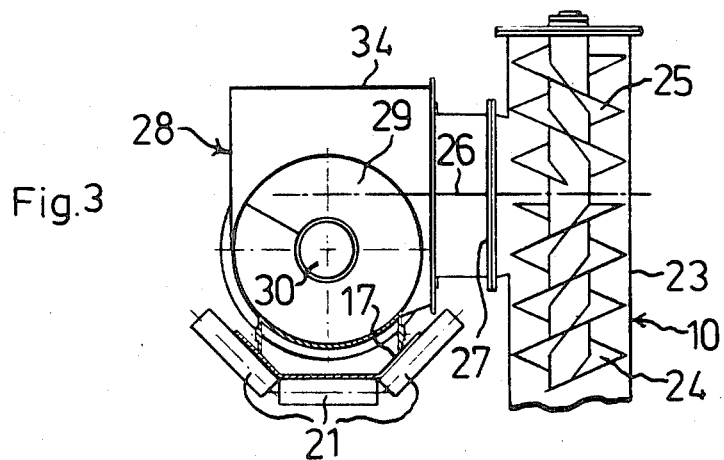
FIG. 3 is a section taken along the line A—A in FIG. 2.
Figure 5:
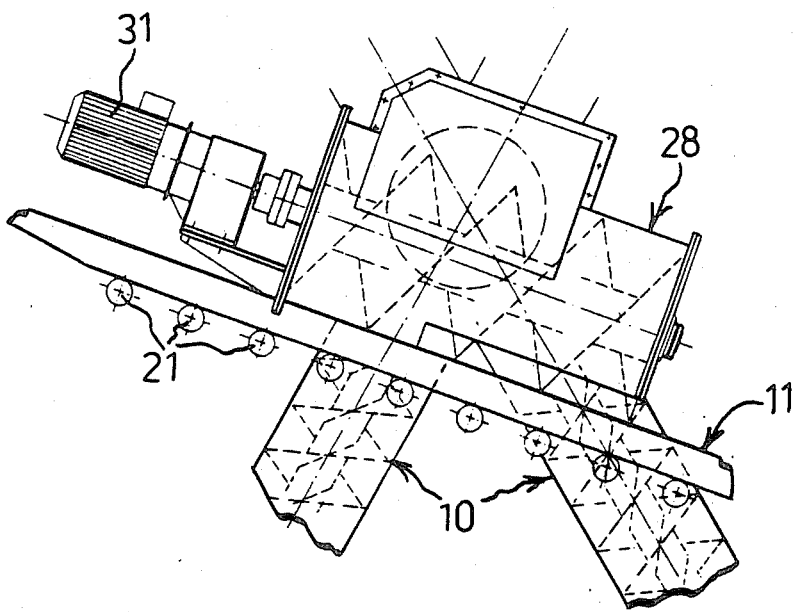

As appears from a comparison of FIGS. 2, 4 and 5, the belt conveyor 11 and the feed conveyor 10 can be inclined. In FIGS. 4 and 5, two extreme positions of the screw conveyor are shown, FIG. 4 representing one contemplated extreme position and FIG. 5 the other contemplated extreme position of the belt conveyor. Since the loading device is designed as a screw conveyor whose discharge opening extends along and is facing the belt conveyor and whose feed screw imparts to the bulk material a motional component in the direction of travel of the belt coneyor, it is possible to transfer very large amounts of material from the feed coneyor to the belt conveyor. In the conveyance of coal, the amounts transferred may be e.g. in the range of 1000–2000 m³/h. As compared with other transfer devices, the invention offers the advantage that the motional component imparted to the material in the longitudinal direction of the conveyor belt makes it possible to use narrower belt widths and yet maintain the capacity of the device. Smaller belt widths reduce the weight of the equipment, a factor which is important especially in connection with unloading devices.

What I claim and desire to secure by Letters Patent is:

1. A loading device for a belt conveyor for transferring bulk material from a feed device, especially a screw conveyor, to a belt conveyor comprising
   a belt conveyor;
   a rotary feed screw positioned substantially parallel to said belt conveyor and having peripheral edges of said rotary feed screw positioned adjacent and in close proximity to an upper surface of said belt conveyor to effect the movement of the bulk material onto and while on said belt conveyor in the travelling direction of said belt conveyor;
   a feed screw casing having a circumferential surface and containing said rotary feed screw;
   said feed screw casing having a discharge opening extending along at least a portion of said circumferential surface of said feed screw casing with said discharge opening facing said belt conveyor.

2. A loading device for a belt conveyor for transferring bulk material from a feed device, especially a screw conveyor, to a belt conveyor comprising
   a belt conveyor;
   a means to impart to the bulk material a motional component in the travelling direction of said belt conveyor including
   a first rotary feed screw positioned substantially parallel to said belt conveyor and having peripheral edges of said first rotary feed screw positioned adjacent and in close proximity to an upper surface of said belt conveyor to effect the movement of the bulk material onto and while on said belt conveyor in the travelling direction of said belt conveyor;
   a first feed screw casing having a circumferential surface and containing said first rotary feed screw;
   said first feed screw casing having a discharge opening extending along at least a portion of said circumferential surface of said first feed screw casing with said discharge opening facing said belt conveyor.

3. The loading device of claim 2 further characterized by
   a feed device including
      a second feed screw casing having a second rotary feed screw contained in said second feed screw casing,
      said second feed screw casing pivotally connected on a pivotal axis to said first feed screw casing by a material inlet opening therebetween to introduce the bulk material substantially at right angles to said first rotary feed screw from said second rotary feed screw.

4. The loading device of claim 3 further characterized by
   said discharge opening in said first feed screw casing extending in substantial alignment with said pivot axis and up to an end of said first feed screw casing being impinged upon by the bulk material travelling in the direction of said belt conveyor.

5. The loading device of claim 3 further characterized by
   said first feed screw having a shaft therethrough about which said first feed screw rotates;
   said material inlet opening having its center spaced farther from said belt conveyor than from said shaft of said first feed screw.

6. The loading device of claim 4 further characterized by
   said first feed screw having a shaft therethrough about which said first feed screw rotates;
   said material inlet opening having its center spaced farther from said belt conveyor than from said shaft of said first feed screw.

* * * * *